US012698713B2

(12) United States Patent
Brettschneider et al.

(10) Patent No.: US 12,698,713 B2
(45) Date of Patent: Aug. 4, 2026

(54) ANNULUS CONTOURING

(71) Applicant: MTU Aero Engines AG, Munich (DE)

(72) Inventors: Markus Brettschneider, Karlsfeld (DE); Fadi Maatouk, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/198,406

(22) Filed: May 17, 2023

(65) Prior Publication Data

US 2023/0383662 A1 Nov. 30, 2023

(30) Foreign Application Priority Data

May 31, 2022 (DE) ......................... 102022113750.3

(51) Int. Cl.
*F01D 5/14* (2006.01)
*F01D 9/04* (2006.01)

(52) U.S. Cl.
CPC .............. *F01D 5/143* (2013.01); *F01D 9/041* (2013.01); *F05D 2240/80* (2013.01); *F05D 2250/71* (2013.01)

(58) Field of Classification Search
CPC .......... F01D 5/142; F01D 5/143; F01D 5/145; F01D 9/02; F01D 9/04; F01D 9/041; F01D 9/042; F05D 2240/80; F05D 2250/71
See application file for complete search history.

(56) References Cited

U.S. PATENT DOCUMENTS 5,466,123 A 11/1995 Rose
7,465,155 B2 12/2008 Nguyen et al.
7,887,297 B2 2/2011 Allen-Bradley et al.
8,439,643 B2 5/2013 Kuhne et al.
8,647,067 B2 2/2014 Pandey et al.
8,727,716 B2 5/2014 Clements et al.
8,834,129 B2 9/2014 Barnes et al.
8,985,957 B2 3/2015 Mahle
(Continued)

FOREIGN PATENT DOCUMENTS

DE 102015224420 A1 6/2017
DE 102018212178 A1 1/2020
(Continued)

*Primary Examiner* — Elton K Wong
(74) *Attorney, Agent, or Firm* — Davidson Kappel LLC

(57) ABSTRACT

An airfoil array segment for an airfoil array of a turbomachine including a platform having a platform surface and an upstream-side platform edge, as well as at least two airfoils, whose leading and trailing edges define an inter-airfoil strip, the platform surface having a trough with a bottom configured such that the bottom is a global minimum and a radial position of the trough decreases relative to a reference surface in the circumferential direction from a suction side of one of the airfoils toward the pressure side of the adjacent other airfoil toward the bottom and from there increases in the circumferential direction, at most up to the radial position of the reference surface, and a radial position of the trough decreasing relative to a reference surface axially in the downstream direction toward the bottom and from there increasing axially in the downstream direction, at most up to the radial position of the reference surface, and the platform surface reaching at most a radial position of the reference surface, the reference surface corresponding to an uncontoured platform surface.

15 Claims, 2 Drawing Sheets

(56) References Cited

U.S. PATENT DOCUMENTS

| | | | | |
|---|---|---|---|---|
| 9,004,865 | B2 | 4/2015 | Guimbard et al. | |
| 9,085,985 | B2 | 7/2015 | Barr et al. | |
| 9,103,213 | B2 | 8/2015 | Barr | |
| 9,140,128 | B2 | 9/2015 | Aggarwala et al. | |
| 9,376,927 | B2 | 6/2016 | Stein et al. | |
| 9,453,415 | B2 | 9/2016 | Engel | |
| 9,464,526 | B2 | 10/2016 | Cellier et al. | |
| 9,470,094 | B2 | 10/2016 | Mahle | |
| 9,551,226 | B2 | 1/2017 | Smith et al. | |
| 9,638,041 | B2 | 5/2017 | Brozyna et al. | |
| 10,151,210 | B2 | 12/2018 | Thomas et al. | |
| 10,161,255 | B2 | 12/2018 | Brozyna et al. | |
| 10,190,417 | B2 | 1/2019 | Brozyna et al. | |
| 10,221,710 | B2 | 3/2019 | Winn et al. | |
| 10,287,901 | B2 | 5/2019 | Aggarwala et al. | |
| 10,480,333 | B2 | 11/2019 | Molony et al. | |
| 10,577,955 | B2 | 3/2020 | Shriley | |
| 10,590,773 | B2 | 3/2020 | Brettschneider | |
| 10,648,339 | B2 | 5/2020 | Mahle et al. | |
| 10,704,393 | B2 | 7/2020 | Maatouk et al. | |
| 10,753,206 | B2 | 8/2020 | Brettschneider et al. | |
| 10,890,072 | B2 | 1/2021 | Balzer | |
| 10,934,849 | B2 | 3/2021 | Brettschneider et al. | |
| 10,968,748 | B2 | 4/2021 | Ramirez | |
| 11,441,428 | B2 | 9/2022 | Senoo et al. | |
| 2010/0284818 | A1 * | 11/2010 | Sakamoto | F01D 5/143 416/241 R |
| 2011/0064580 | A1 * | 3/2011 | Barnes | F01D 5/143 416/204 A |
| 2012/0051900 | A1 * | 3/2012 | Clements | F01D 9/041 415/208.2 |
| 2013/0156563 | A1 * | 6/2013 | Mahle | F04D 29/547 415/191 |
| 2014/0348661 | A1 | 11/2014 | Mahle et al. | |
| 2016/0237837 | A1 | 8/2016 | Bennington | |
| 2016/0326895 | A1 | 11/2016 | Kisliger et al. | |
| 2017/0074101 | A1 * | 3/2017 | Takahashi | F04D 29/681 |
| 2017/0159443 | A1 | 6/2017 | Pernleitner et al. | |
| 2018/0223670 | A1 * | 8/2018 | Brettschneider | F04D 29/542 |
| 2019/0085868 | A1 | 3/2019 | Anand et al. | |
| 2019/0203612 | A1 * | 7/2019 | McMahon | F01D 9/065 |
| 2020/0263551 | A1 | 8/2020 | Koda | |
| 2020/0325787 | A1 * | 10/2020 | Seki | F01D 9/041 |
| 2021/0115798 | A1 * | 4/2021 | Gustafson | F01D 5/143 |

FOREIGN PATENT DOCUMENTS

| | | | |
|---|---|---|---|
| EP | 1087100 | A2 | 3/2001 |
| EP | 1270872 | B1 | 9/2008 |
| EP | 997612 | B1 | 1/2012 |
| EP | 2423444 | A2 | 2/2012 |
| EP | 2487329 | B1 | 11/2013 |
| EP | 2241723 | B1 | 8/2014 |
| EP | 2787172 | A2 | 10/2014 |
| EP | 2673472 | B1 | 10/2015 |
| EP | 2692986 | B1 | 10/2015 |
| EP | 2696029 | B1 | 10/2015 |
| EP | 2260179 | B1 | 4/2016 |
| EP | 2787171 | B1 | 6/2016 |
| EP | 2787172 | B1 | 6/2016 |
| EP | 3064706 | A1 | 9/2016 |
| EP | 3181812 | A1 | 6/2017 |
| EP | 3091180 | B1 | 10/2017 |
| EP | 2586974 | B1 | 12/2017 |
| EP | 2369138 | B1 | 1/2018 |
| EP | 3375977 | A1 | 9/2018 |
| EP | 3404211 | A1 | 11/2018 |
| EP | 2806103 | B1 | 7/2019 |
| EP | 2938829 | B1 | 10/2019 |
| EP | 3388626 | B1 | 11/2019 |
| EP | 3369892 | B1 | 8/2020 |
| EP | 3158167 | B1 | 10/2020 |
| EP | 3205820 | B1 | 11/2020 |
| EP | 3358135 | B1 | 1/2021 |
| EP | 2959108 | B1 | 4/2021 |
| EP | 3722555 | B1 | 1/2022 |
| EP | 3090126 | B1 | 5/2022 |
| JP | 2006291889 | A | 10/2006 |
| WO | WO2020129390 | A1 | 6/2020 |

* cited by examiner

ANNULUS CONTOURING

This claims the benefit of German Patent Application DE 102022113750.3, filed on May 31, 2022 and which is hereby incorporated by reference herein.

The present invention relates to an airfoil array segment, an airfoil array, and a system having the aforementioned airfoil array.

BACKGROUND

Turbomachines (such as gas and steam turbines) generally have a flow duct for passage of a fluid therethrough. The flow duct, also referred to as "annulus," is radially inwardly bounded by the shaft of a rotor and radially outwardly by a casing. As used herein, and unless otherwise stated, the terms "radial," "axial," and "circumferential direction," as well as terms derived therefrom, are taken with respect to an axis of rotation of the rotor.

A turbomachine has airfoil arrays (also commonly referred to as "blade rings" and "vane rings) arranged in its annulus. The airfoil arrays include stator vanes or rotor blades, which are arranged in succession and substantially equally spaced in the circumferential direction, as well as associated platforms, which are also referred to as "shrouds" and generally have an upstream-side or leading platform edge and a downstream-side or trailing platform edge. These platform edges delimit the platform surface in the axial direction. The term "platform surface" as used herein refers to the surface of the platform that faces the annulus.

The platform edge first passed over by the (axial) primary flow that is directed during operation through the annulus of the turbomachine is referred to herein as "upstream-side" platform edge or "leading" platform edge; correspondingly, the opposite edge is referred to as "downstream-side" platform edge or "trailing" platform edge. Correspondingly, the terms "downstream" and "upstream" as well as "leading" and "trailing" refer to the axial primary flow direction, and, more specifically, only to the axial position, regardless of any possible offset in the circumferential or radial direction. Specifically, a point is understood herein as being located "downstream of the leading edges" (or as being located "downstream of another point"), if, relative to a direct connection of the leading edges (to one another) on the platform surface (or relative to another point), it is axially offset in the direction of (i.e., following) the primary flow. This applies analogously to the term "upstream" (in the opposite direction).

The section of the platform surface that is axially bounded by the direct connections between the leading and trailing edges of adjacent airfoils on the platform surface (i.e., the connections extending in the circumferential direction without deviating axially therefrom) and circumferentially by the pressure side of one airfoil and the suction side of the other airfoil is referred herein as "inter-airfoil strip." The width of the inter-airfoil strip in the circumferential direction, in particular at the leading edges, is referred to as "pitch spacing" (of the airfoil array or of an airfoil array segment or of the airfoils). Specifically, the pitch spacing may be measured as the circumferential spacing between the leading edges of adjacent airfoils in the area of the platform surface. The distance between the leading and trailing edges of the airfoils measured (only) in the direction of the designated axial primary flow is referred to as the "axial chord length."

The pressure side of one airfoil and the suction side of an adjacent airfoil each circumferentially bound what is generally referred to as an airfoil passage. Within the turbomachine, this airfoil passage is radially bounded by what is known as endwalls. These endwalls are formed on one side by the platforms and on the other side by sections located radially opposite these platforms. In the case of rotor blades, such an opposite endwall is typically a radially outer section (in particular of the casing, especially in the case of shroudless rotor blades, or of a rotor blade outer shroud); in the case of stator vanes, it is typically a radially inner section (in particular of a rotor hub) or a radially outer section.

A fluid flow passing through a flow duct is generally influenced by the surfaces of the endwalls. Due to their lower velocity, flow layers near these surfaces are deflected to a greater degree than flow layers which are further away from the endwalls. Thus, a secondary flow is formed which is superimposed on an axial primary flow and leads, in particular, to vortices and pressure losses.

To reduce secondary flows, often, contours in the form of elevations and/or depressions are formed in the endwalls.

A variety of such contours, commonly known as "endwall contours," are known from the prior art. The Applicant's patents or patent applications EP 2 487 329 B1, EP 2 787 172 A2, and EP 2 696 029 B1 should be mentioned by way of example.

EP 2 423 444 A2 describes an endwall contour where an elevation is located on the pressure side of a first airfoil and a depression extends parallel to the suction side of an adjacent airfoil. The elevation and depression form a curved channel.

SUMMARY OF THE INVENTION

It is an object of the present invention to provide a technique that makes it possible to advantageously further reduce secondary flows in the annulus of a turbomachine or to improve the technique.

The present invention provides an airfoil array segment, an airfoil array, and a system. Advantageous embodiments are disclosed in the description, and the figures. Advantageous embodiments of the invention are the subject matter of the dependent claims.

In accordance with an embodiment of the present invention, there is provided an airfoil array segment for an airfoil array of a turbomachine, the airfoil array segment including a platform having a platform surface and an upstream-side platform edge, as well as at least two airfoils, in particular a first airfoil and a second airfoil, whose leading and trailing edges define an inter-airfoil strip having the axial chord length on the platform surface. In an embodiment, the platform surface of the inter-airfoil strip, in particular the platform surface, has a trough, in particular exactly one trough, having a global minimum, in particular exactly one global minimum, with respect to a radial position. In one embodiment, the trough is in particular configured such that the bottom of the trough is a global minimum of the trough, and further, in one embodiment, such that a radial position of the trough decreases in the circumferential direction from a suction side of one (the first) of the at least two airfoils toward the pressure side of the adjacent other (the second) of the at least two airfoils relative to a reference surface toward the bottom of the trough and from there increases in the circumferential direction, at most up to the radial position of the reference surface. In an embodiment, the bottom of the trough or the global minimum corresponds to the greatest distance of the platform surface or contour from a reference surface.

In an embodiment of the invention, a radial position of the trough decreases axially in the direction of flow relative to a reference surface toward the bottom of the trough and from there increases axially, at most up to (and including) the radial position of the reference surface.

In other words, starting from the bottom of the trough, the radial position of the platform surface approaches the radial position of the (uncontoured) platform surface in the circumferential and/or axial direction, especially in any combination of these directions.

In an embodiment of the invention, the platform surface of the inter-airfoil strip, in particular the platform surface, has a trough, in particular exactly one trough, having a maximum whose radial position is at most equal to a radial position of an uncontoured reference platform surface.

In an embodiment of the invention, the radial position of the (contoured) platform surface of the inter-airfoil strip, in particular the (entire) platform surface, reaches at most a radial position of the reference surface, and, in particular, the platform surface of the inter-airfoil strip, in particular the platform surface, is not intersected by the reference surface.

In other words, in an embodiment, the maximum of the trough and/or in particular of the platform surface of the inter-airfoil strip, in particular of the (entire) platform surface, is at most equal to the radial position, in particular to the radial level, of a theoretical (preferably imaginary) non-contoured platform surface of the inter-airfoil strip and/or of a non-contoured platform surface, and, in particular, is not elevated above this radial position or not higher than the radial position of the non-contoured reference (platform) surface. A "reference platform surface" is preferably understood herein as a platform surface that is non-contoured, in particular in particular circumferentially symmetric, and which, moreover, corresponds in particular to the geometric dimensions of the (contoured) platform surface, except for the contoured area, or has respective identical geometric dimensions, except for the contoured area, and is preferably referred to herein as the "reference surface."

In an embodiment, the airfoil array segment, in particular the platform surface and/or the inter-airfoil strip of the airfoil array segment, has no elevation.

An "elevation" is understood herein to be a local formation (such as a hump or protrusion) of the platform surface where (in particular in comparison to a platform surface of a non-contoured platform) the platform surface extends radially in the same direction in which the airfoils project from the platform. Thus, in the case of an elevation on a platform that radially outwardly bounds the annulus, an elevation extends radially inwardly, and in the case of an elevation on a platform that radially inwardly bounds the annulus, radially outwardly.

A "trough" is preferably understood herein as a local formation of the platform surface in the opposite direction, in particular in the opposite direction of an elevation (such as a dip, depression, or recess), in particular where the platform surface extends radially in a direction opposite to the direction in which the airfoils project from the platform. Thus, in the case of a trough on a platform that radially outwardly bounds the annulus, a trough extends radially outwardly, and in the case of a trough on a platform that radially inwardly bounds the annulus, radially inwardly.

Thus, the terms "elevation" and "trough" (as well as terms such as "depth," "height," and the like) are based here on an orientation or a coordinate system where the airfoils and an elevation each extend "upwardly" from the platform surface. Correspondingly, a trough extends "downwardly" in the opposite direction. Therefore, a description using only one direction is not a limitation to this direction, but may also refer, or refers, to the other direction.

A highest or lowest point of an elevation or of a trough is understood to be a farthest point to which each of these extend in the respective direction. The highest or lowest points of an elevation or of a trough may each form a respective surface section or curve, or be singular.

In an embodiment, an airfoil array segment may be a single piece or an assembly. In an embodiment, the platform may be a single piece or include or have two or more parts, each having an airfoil extending therefrom, or the platform may be configured as a separate component which is, or can be, disposed between the airfoils. Accordingly, in an embodiment, a platform is adapted to adjoin an airfoil on each side in the circumferential direction and to form, together with the airfoils (of which none, exactly one, or both may be permanently formed on the platform integrally therewith), an airfoil array segment according to any of the embodiments disclosed herein. In an embodiment, the platform may be configured to be used in the turbomachine such that its upstream-side platform edge is (at least substantially) adjacent to a further (separate) element (e.g., of the hub, the casing, or of another airfoil array).

In an embodiment, the upstream-side platform edge is adapted for forming a portion of a wall of a gap through which cooling fluid is or may be introduced into the annulus of the turbomachine.

In an embodiment, the trough, in particular the exactly one trough, has at least one local minimum and/or at least one saddle point, and further has a global minimum, in particular exactly one global minimum, or a bottom.

In an embodiment, the reference surface takes the form of a lateral cone surface, the lateral cone surface being disposed coaxially with the platform. In an embodiment, the lateral cone surface has a linear generatrix. The lateral cone surface "intersects" the leading and trailing edges or their respective projections, in each case in particular in a (radially lowest) hub position±5%, in particular ±2% of the chord length at 50% of the radial span of the airfoil, or, in the case of a fillet, "intersects" the respective hub-side fillet boundary at positions that are located upstream of the leading edge or downstream of the trailing edge, in particular on a projection of the mean camber line, ±5%, in particular ±2% of the chord length at 50% of the radial span of the airfoil. In an embodiment, a maximum of the trough with respect to a radial position locally reaches at most a circumferentially symmetric level defined by the reference surface. In other words, a maximum of the trough is not elevated above the aforementioned lateral cone surface with respect to a radial position. "Reference surface" may preferably also be understood as a "zero level" or "zero reference level."

In an embodiment, the reference surface is configured and disposed coaxially with the platform surface, in particular coaxially with the axis of rotation of the turbomachine, in such a way that it contains the radial hub positions of the leading edge and the trailing edge of the airfoil plus at most 5% and/or minus at most 5% of the chord length of the airfoil at 50% of its radial span. In other words, in an embodiment, the reference surface is configured such that it contains the radial hub position of the leading edge of the airfoil, in particular of the airfoils, plus at most 5% or minus at most 5% of the chord length of the airfoil at 50% of the radial span of the airfoil and the radial hub position of the trailing edge of the airfoil, in particular of the airfoils, plus at most 5% or minus at most 5% of the chord length of the airfoil at 50% of the radial span of the airfoil, the reference surface being configured (in particular) as a lateral cone surface. In an embodiment, the reference surface is configured such that it contains the radial hub position of the leading edge of the airfoil, in particular of the airfoils, plus at least 1%, in particular at least 2.5%, or minus at least 1%, in particular at least 2.5%, and/or plus at most 15% or minus at most 15%, of the chord length of the airfoil at 50% of the radial span of the airfoil and the radial hub position of the trailing edge of the airfoil, in particular of the airfoils, plus at least 1%, in particular at least 2.5%, or minus at least 1%, in particular at least 2.5%, and/or plus at most 15% or minus at most 15%, of the chord length of the airfoil at 50% of the radial span of the airfoil, the reference surface being configured (in particular) as a lateral cone surface. In an embodiment, a maximum of the trough and/or in particular a maximum level with respect to a radial position of the trough, in particular of the exactly one trough, of the platform surface contour can thus be defined in a manner that advantageously influences a secondary flow.

The term "hub position" is preferably understood herein to mean the following: In the case of a platform that radially outwardly bounds the annulus, a hub position is therefore preferably understood herein as the position that is radially farthest from the axis of rotation, in particular at the leading edge and/or trailing edge of the airfoil(s). In the case of a platform that radially inwardly bounds the annulus, a hub position is preferably understood herein as the position that has the least distance from the axis of rotation, in particular at the leading edge and/or trailing edge of the airfoil(s). Preferably, radial "hub position" can be understood to mean 0% radial height.

In an embodiment, the minimum of the trough is formed at an axial position of at least 40% and/or at most 60% relative to the axial chord length, in particular at an axial position of at least 45% and/or at most 55%. In an embodiment, the secondary flow can thereby be influenced in a particularly advantageous manner.

In an embodiment, given a pitch of the inter-airfoil strip in the circumferential direction, the minimum of the trough is formed at a distance of at most 10% of the pitch spacing from the suction side of an airfoil of the airfoil array segment. In other words, a distance of the lowest point of the trough from the suction side of an airfoil, as measured in the circumferential direction, is preferably at most 10%, at most 9%, at most 8%, at most 7%, at most 6%, or at most 5% of a pitch spacing of the airfoil array segment. In particular, a lowest point of the trough may lie on a boundary line between the suction side of the airfoil and the platform surface (so that the aforementioned distance measured in the circumferential direction is zero in each case). In an embodiment, this may advantageously influence the secondary flow.

In an embodiment, the trough, in particular the edge of the trough, begins upstream of the leading edge of the airfoil(s), in particular at an axial position spaced upstream from the leading edge of the airfoil by at least 1%, in particular at least 2.5%, and/or at most 25%, in particular at most 10%, of the chord length of the airfoil at 50% of its radial span.

In an embodiment, given the aforementioned dimensions of the trough with the at least one minimum, in particular the exactly one global minimum, channel vortices can be particularly effectively reduced due to the flow caused by the respective curvatures of the pressure side of the first airfoil and the suction side of the second airfoil.

In one embodiment, a farthest upstream point of a boundary of the trough is located upstream of the leading edges of the airfoils, in particular at least 1% and/or at most 5% of the axial chord length upstream of the leading edges of the airfoils, may in particular have an axial position substantially in common with the leading edges of the airfoils, or, in one embodiment, is located at least 1% and/or at most 5% of the axial chord length downstream of the leading edges of the airfoils.

In an embodiment, in particular in total, at least 90%, in particular at least 95%, of the platform surface of the inter-airfoil strip is recessed relative to the reference surface, and, in particular, at least 90%, in particular at least 95%, of the platform surface of the inter-airfoil strip is formed as a trough.

In an embodiment, the platform edge has a wavy shape, in particular in the circumferential direction. In an embodiment, the wavy shape may be configured such that a wave, from a wave trough to a wave crest, corresponds to at least one percent of the distance of the platform edge from a leading edge of an airfoil and/or at most 25% of this distance. In an embodiment, the wavy shape, in particular the radial difference between a wave trough and a wave crest, is at least 1% and/or at most 15% of the axial chord length of the airfoil at 50% of its radial span. In an embodiment, the wave trough and the wave crest are located in the same plane defined by the platform surface. In other words, an axial position of the platform edge, but not a radial position thereof, varies with the transition from the wave trough to the wave crest. In an embodiment, the wavy shape is formed in the radial direction. In particular, the wave troughs and the wave crests are formed along an axial position circumferentially symmetrically on the platform edge, in particular the upstream-side platform edge. In other words, in this embodiment, an axial position of the platform edge is at least substantially constant and a radial position of the platform edge is configured circumferentially symmetrically in a wave-like manner, in particular such that, in an embodiment, the wave crests (at least substantially) do not intersect a lateral cone surface, as described herein. In other words, a radial position of the wave crests does not go beyond the radial position of the lateral cone surface, and, in particular, is at most equal to a radial position of the lateral cone surface. In an embodiment, the wavy shape is formed in both the radial position and the axial position of the platform edge, which corresponds in particular to a mixture, in particular a combination, of the aforedescribed forms of a wavy shape of the platform edge. In an embodiment, the wavy shape, in particular the radial difference and/or the axial difference between a wave trough and a wave crest, is at least 1% and/or at most 15% of the axial chord length of the airfoil at 50% of its radial span. In an embodiment, this advantageously makes it possible to optimize the flow incident on the airfoils, in particular to reduce vortices. In addition, in an embodiment, it is possible to improve, in particular reduce, noise emissions.

In accordance with an embodiment, an airfoil passage extends through an airfoil array segment as described herein, in particular an airfoil array segment according to any of the embodiments disclosed herein; i.e., is bounded by such an airfoil array segment and an endwall located opposite the platform thereof (facing the platform surface). In accordance with an embodiment, an airfoil passage as described herein is bounded in the circumferential direction by the pressure side of one of the airfoils of the airfoil array segment and the opposite suction side of another (adjacent) one of the airfoils.

In accordance with an embodiment, an airfoil passage for a turbomachine is provided which is bounded by an airfoil array segment as described herein and by an endwall located opposite the platform of the airfoil array segment.

In an embodiment of the invention, an airfoil array is provided. In accordance with an embodiment, the airfoil array includes at least one airfoil array segment as described herein, in particular according to any of the embodiments disclosed herein.

In an embodiment of the invention, a system is provided. In accordance with an embodiment, the system has at least one airfoil array, in particular an airfoil array having at least one airfoil array segment as described herein.

In accordance with an embodiment, the platform surface of the at least one airfoil array segment of the system corresponds to at least a portion of a radially inner platform wall of a stator vane cluster, in particular of a stator vane cluster of the system.

In accordance with an embodiment, the system includes a turbine and/or a compressor. In particular, the system may be a turbine and/or a compressor, and more specifically a low-pressure turbine of an aircraft engine.

In accordance with an embodiment, a system configured as a turbomachine includes one or more airfoil arrays as described herein.

In an embodiment, the static pressure field on the platform surface and on the airfoils can be influenced, in particular improved, especially in the edge region, by the geometry of the platform surface. Advantageously, in an embodiment, the secondary flow, in particular vortices in the airfoil passage, can be reduced; i.e., such reduction is achieved by the geometry of the platform surface. In an embodiment, it is thus possible to reduce losses and/or to improve the flow into a possible further airfoil array located downstream.

In an embodiment, the platform surface of the inter-airfoil strip, in particular the platform surface, may have a maximum, in particular a zero-elevation surface; i.e., a surface section that is, in particular entirely, at the zero level. In an embodiment, this section is at most 10% of the inter-airfoil strip or includes at most 10% of the platform surface between the airfoils and, in particular, is disposed such that a distance of the maximum, in particular of the zero-elevation surface, from the pressure side of the airfoil, is preferably at most 40%, at most 20%, at most 10%, at most 5%, or at most 2.5% of a pitch spacing of the airfoil array segment.

In an embodiment, the airfoil array segment, the airfoil array, the airfoil passage, and the platform are in particular part of a low-pressure turbine or are adapted to be installed and used in a low-pressure turbine. In an embodiment, the airfoils may be stator vanes or rotor blades. In an embodiment, the platform is further adapted to radially inwardly or radially outwardly bound an airfoil passage extending through the airfoil array segment.

In accordance with an embodiment, a possibly present fillet is not part of the contoured region of the annulus, in particular not part of the trough of the platform surface of the platform. In an embodiment, in the case of a possibly present fillet, a hub position is located radially below the fillet, in particular at a radial position under or below the fillet, or the hub position has at most one radial position that coincides with the lowest radial position of the fillet, in particular on a projection of the leading edge and/or of the trailing edge of the airfoil. A "fillet" as used herein is preferably understood as a rounded corner of the airfoil root. In an embodiment, if in doubt, a fillet is to be understood as part of the airfoil. Accordingly, in an embodiment, a hub position of the airfoil (including the fillet) is determined.

Embodiments of the invention as described herein may be combined (in accordance with the invention) wherever technically reasonable and feasible.

BRIEF DESCRIPTION OF THE DRAWINGS

Other advantageous embodiments of the present invention will become apparent from the dependent claims and the following description of preferred embodiments. To this end, the drawings show, partly in schematic form, in:

DETAILED DESCRIPTION

Figure 1:
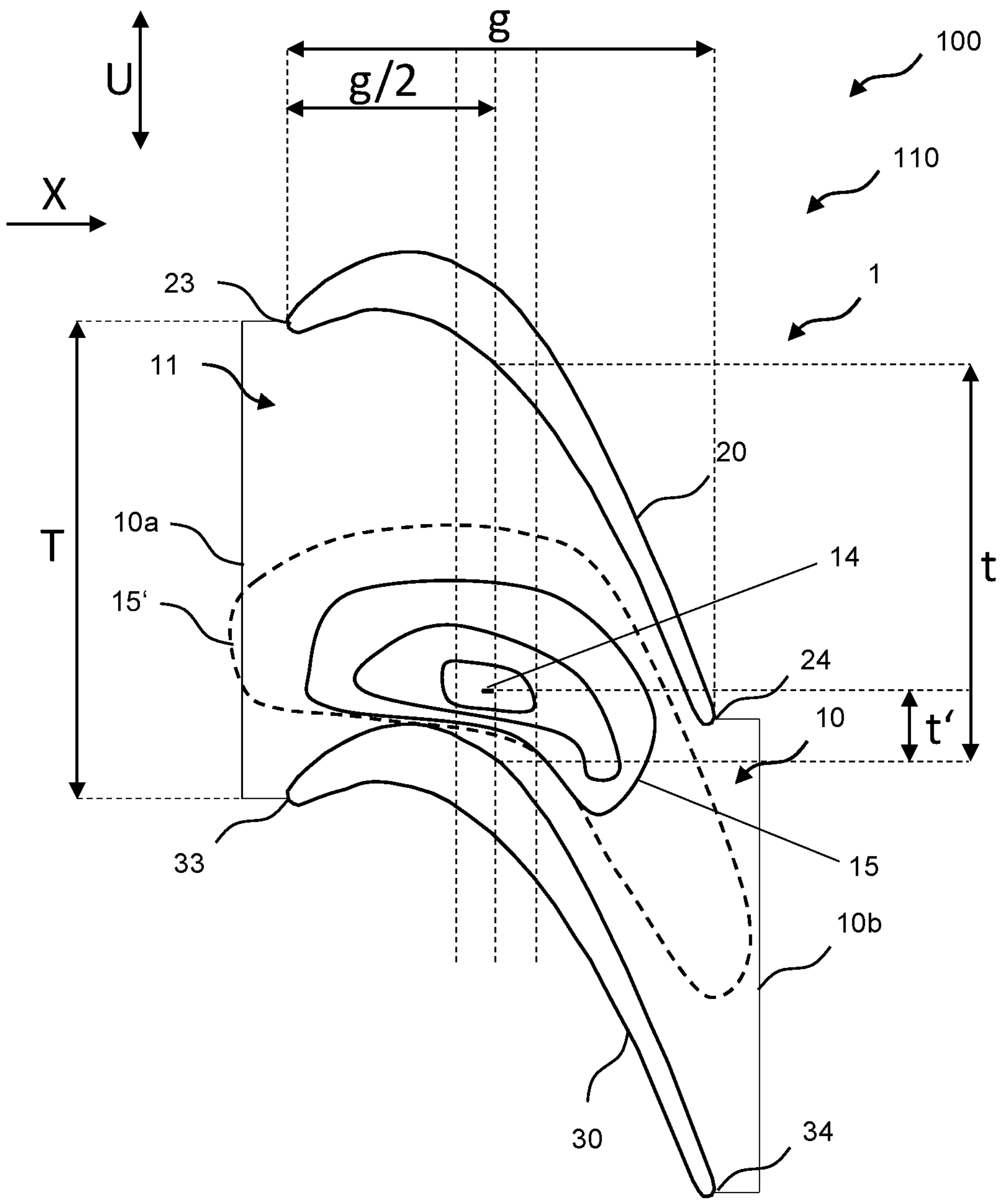
FIG. 1: a plan view of an airfoil array segment according to an embodiment of the present invention.

FIG. 1 schematically shows an airfoil array segment in a developed plan view (looking in a radial direction). It includes airfoils 20, 30, each having a pressure side and a suction side, as well as a platform 10 having a platform surface, an upstream-side platform edge 10*a*, and a downstream-side platform edge 10*b* (viewed relative to designated primary flow direction X). The platform may be a single piece or include, for example, two parts (not shown). In particular, it may include two parts from which one of the airfoils 20, 30 extends, respectively.

The airfoils define an inter-airfoil strip as the surface section that is located in circumferential direction U between the pressure side of first airfoil 20 and the suction side of second airfoil 30 and that, in axial direction X, is bounded on the upstream side by a connection between leading edges 23, 33 of airfoils 20, 30 and on the downstream side by a connection between respective trailing edges 24, 34. The connections mentioned extend at the platform surface only in circumferential direction U (i.e., without deviating axially therefrom) and are spaced apart by a distance equal to the axial chord length g of the inter-airfoil strip. The platform surface is contoured in inter-airfoil strip 11, the contour being implemented by a trough, in particular exactly one trough 15.

A pitch spacing T is defined as the distance between leading edges 23, 33 at the platform surface, a pitch t as the distance from the pressure side of one airfoil to the suction side of the other airfoil at an axial position. In the figure, the distance t' of minimum 14 from the suction side (in particular relative to a pitch) is at most 10% of pitch t. Airfoil array segment 1 may be part of an airfoil array 110, and an airfoil array 110 may include at least one airfoil array segment 1 configured for a system 100.

Trough 15, which is non-proportionally and schematically illustrated in FIG. 1, is located at an axial position of at least 40% and at most 60% relative to axial chord length g, as illustrated by g/2 for 50% of axial chord length g.

15' indicates a beginning of a trough or a boundary of a trough which begins upstream of leading edges 23, 33 of airfoils 20, 30 and which, in the embodiment shown here, also extends beyond the axial position of the trailing edges of airfoils 20, 30.

A wavy shape of the upstream-side platform edge 10*a* is not shown. Such a wavy shape would correspond, for example, to a wavy line 10*a*.

Figure 2:
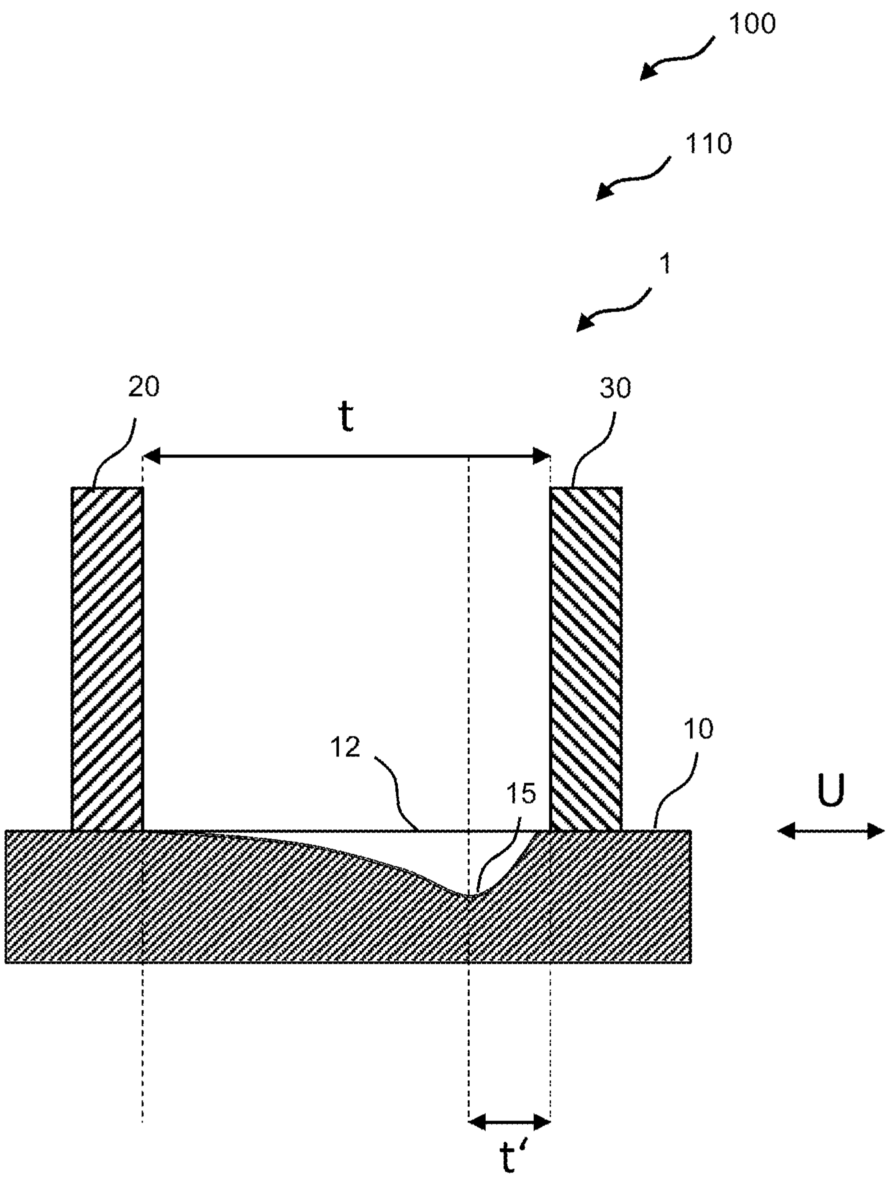
FIG. 2: a front elevation sectional view of an airfoil array segment according to an embodiment.

In FIG. 2, an airfoil array segment 1 is shown in a front elevation sectional view taken at the axial position of the (global) minimum of trough 15; i.e., for example, looking in primary flow direction X. The airfoil array segment may be part of an airfoil array 110 configured for a system 100. Circumferential direction U is also shown for orientation purposes. Airfoils 20, 30 are also shown in a sectional view at this axial position, the connection of the airfoils to the platform not being shown true to design. A simplified representation was selected in which airfoils 20, 30 and platform 10 are shown as separate parts in cross section. Minimum 15 is spaced from the suction side of airfoil 30 by a distance t' of less than 10% of pitch t. Trough 15 has no elevation relative to a lateral cone surface 12 (shown here in simplified form); i.e., is disposed "under" lateral cone surface 12 with respect to a radial position. It is also indicated in FIG. 2 that the trough has a maximum which is at most equal to the radial position of an uncontoured platform surface, in particular at most to a radial position of a lateral cone surface 12. By way of example, for trough 15, as shown in FIG. 2, this holds true for the side of trough 15 at the pressure side of airfoil 20, shown on the left in the figure. Furthermore, the platform surface of inter-airfoil strip 11 has no elevation.

While exemplary embodiments have been presented in the foregoing detailed description, it should be appreciated that many modifications are possible. It should also be appreciated that the exemplary embodiments are only examples, and are not intended to limit the scope, applicability, or configuration in any way. Rather, the foregoing detailed description will provide those skilled in the art with a convenient road map for implementing at least one exemplary embodiment, it being understood that various changes may be made in the function and arrangement of elements described without departing from the scope of protection as set forth in the appended claims or derived from combinations of features equivalent thereto.

LIST OF REFERENCE NUMERALS

1 airfoil array segment
10 platform
10*a* upstream-side platform edge
10*b* downstream-side platform edge
11 inter-airfoil strip
12 lateral cone surface
14 (global) minimum
15 trough
15' (other) embodiment of a trough
30 airfoil
23, 33 leading edges
24, 34 trailing edges
100 system
110 airfoil array
g axial chord length
g/2 50% of the axial chord length
T pitch spacing
t pitch
t' distance from the suction side
U circumferential direction
X designated axial primary flow direction

What is claimed is:

1. An airfoil array segment for an airfoil array of a turbomachine, the airfoil array segment comprising:

a platform having a platform surface and an upstream-side platform edge;

at least two airfoils, whose leading and trailing edges define an inter-airfoil strip having an axial chord length on the platform surface;

the platform surface of the inter-airfoil strip having a trough with a bottom, the trough being configured such that the bottom of the trough is a global minimum of the trough and a radial position of the trough decreases in the circumferential direction from a suction side of one of the at least two airfoils toward the pressure side of an adjacent other of the at least two airfoils relative to a reference surface toward the bottom of the trough and from there increases in a circumferential direction, at most up to a radial position of the reference surface, and a radial position of the trough decreasing axially in the downstream direction relative to a reference surface toward the bottom of the trough and from there increasing axially in the downstream direction, at most up to a radial position of the reference surface, and the platform surface of the inter-airfoil strip reaching at most a radial position of the reference surface, the reference surface corresponding to an uncontoured platform surface;

wherein the global minimum is formed at an axial position of at least 40% and at most 60% relative to the axial chord length on the platform surface;

wherein the trough begins at an axial position spaced upstream from the leading edge of the airfoil by at most 25% of the chord length of the airfoil at 50% of a radial span of the airfoil.

2. The airfoil array segment as recited in claim 1 wherein the reference surface takes the form of a lateral cone surface disposed coaxially with the platform, and a maximum of the platform surface of the inter-airfoil strip with respect to a radial position locally reaches at most a circumferentially symmetric level defined by the reference surface.

3. The airfoil array segment as recited in claim 2 wherein a maximum of the trough with respect to a radial position locally reaches at most a circumferentially symmetric level defined by the reference surface.

4. The airfoil array segment as recited in claim 1 wherein the reference surface is configured to contain radial hub positions of the leading edge and the trailing edge of the airfoil plus at most 5% or minus at most 5% of the chord length of the airfoil at 50% of a radial span of the airfoil.

5. The airfoil array segment as recited in claim 1 wherein given a pitch of the inter-airfoil strip in the circumferential direction, the global minimum is formed at a distance of at most 10% of the pitch from a suction side of the airfoil.

6. The airfoil array segment as recited in claim 1 wherein the platform surface of inter-airfoil strip has no elevation so that a radial position of the platform surface reaches at most a radial position of the reference surface.

7. The airfoil array segment as recited in claim 1 wherein in total at least 90% of the platform surface of the inter-airfoil strip is recessed relative to the reference surface.

8. The airfoil array segment as recited in claim 7 wherein in total at least 95% of the platform surface of the inter-airfoil strip is recessed relative to the reference surface.

9. The airfoil array segment as recited in claim 7 wherein the recessed portion defines the trough.

10. The airfoil array segment as recited in claim 1 wherein the platform edge has a wavy shape.

11. The airfoil array segment as recited in claim 10 wherein platform edge has the wavy shape in the circumferential direction.

12. An airfoil array for a turbomachine, the airfoil array comprising at least one airfoil array segment as recited in claim 1.

13. A system comprising the airfoil array as recited in claim 12 wherein the platform surface of the at least one airfoil array segment corresponds to at least a portion of a radially inner platform wall of a stator vane cluster.

14. A turbine or a compressor comprising the system as recited in claim 13.

15. A low-pressure turbine of an aircraft engine comprising the system as recited in claim 13.

* * * * *